United States Patent [19]

Selvarajan

[11] Patent Number: 5,605,970
[45] Date of Patent: Feb. 25, 1997

[54] SYNTHESIS OF HIGH MOLECULAR WEIGHT ANIONIC DISPERSION POLYMERS

[75] Inventor: Radhakrishnan Selvarajan, Downers Grove, Ill.

[73] Assignee: Nalco Chemical Company, Naperville, Ill.

[21] Appl. No.: 620,051

[22] Filed: Mar. 20, 1996

[51] Int. Cl.[6] ........................................ C08F 2/16
[52] U.S. Cl. ..................... 525/274; 525/301; 525/266; 525/308; 525/309; 520/210; 520/234; 520/240; 526/328; 526/318.4
[58] Field of Search ..................... 526/210, 234, 526/240, 318.4, 328; 525/274, 301, 266, 308, 309

[56] References Cited

U.S. PATENT DOCUMENTS 3,493,500  2/1970  Volk ........................................ 210/54
4,929,655  5/1990  Takeda ................................... 524/458
5,373,066  12/1994  Rebre ..................................... 525/387

*Primary Examiner*—Irina S. Zemel
*Attorney, Agent, or Firm*—James J. Drake; Robert A. Miller; Patricia A. Charlier

[57] ABSTRACT

A process for synthesizing high molecular weight anionic dispersion polymer is disclosed, the process comprising providing a mixture of water, acrylic acid and a stabilizer; cooling the mixture to a temperature of less than 35° C.; lowering the pH of the mixture to less than 4.5; adding ethylhexyl acrylate to the mixture to form an aqueous solution; stirring the aqueous solution; purging the solution with nitrogen simultaneous with the step of stirring; heating the solution to about 48° C.; adding initiator for from about 2 to about 3 hours; heating the solution to about 75° C. for about 30 to about 60 minutes; and cooling and collecting the polymer.

1 Claim, No Drawings

SYNTHESIS OF HIGH MOLECULAR WEIGHT ANIONIC DISPERSION POLYMERS

BACKGROUND OF THE INVENTION

1. Field of the Invention

The invention relates to a process for synthesizing dispersion polymers and, more particularly, to a process for synthesizing high molecular weight anionic dispersion polymers.

2. Description of the Prior Art

Anionic or nonionic dispersion polymers, which are completely free of oil and emulsifiers, are not available in the market today. Although claims were made in U.S. Pat. No. 3,493,500 issued to Dow Chemical Company in 1970 and Kyoritsu Yuki in U.S. Pat. No. 4,929,655 in 1991 for methods of manufacturing aqueous anionic/nonionic dispersion polymers, stable dispersion polymers could not be made by either of the above processes. Further, the Yuki process requires stabilization of the dispersed particles with an oil and an emulsifier. Because of environmental regulations, there is an increasing demand, for polymers free of oil and surfactants.

In the process of dispersion polymerization, the monomer and the initiator are both soluble in the polymerization medium, but the medium is a poor solvent for the resulting polymer. Accordingly, the reaction mixture is homogeneous at the onset, and the polymerization is initiated in a homogeneous solution. Depending on the solvency of the medium for the resulting oligomers or macroradicals and macromolecules, phase separation occurs at an early stage. This leads to nucleation and the formation of primary particles called "precursors" and the precursors are colloidally stabilized by adsorption of stabilizers. The particles are believed to be swollen by the polymerization medium and/or the monomer, leading to the formation of spherical particles having a size in the region of ~0.1–10.0 microns.

In any dispersion polymerization, the variables that are usually controlled are the concentrations of the stabilizer, the monomer and the initiator, solvency of the dispersion medium, and the reaction temperature. It has been found that these variables can have a significant effect on the particle size, the molecular weight of the final polymer particles, and the kinetics of the polymerization process.

Particles produced by dispersion polymerization in the absence of any stabilizer are not sufficiently stable and may coagulate after their formation. Addition of a small percentage of a suitable stabilizer to the polymerization mixture produces stable dispersion particles. Particle stabilization in dispersion polymerization is usually referred to as "steric stabilization". Good stabilizers for dispersion polymerization are polymer or oligomer compounds with low solubility in the polymerization medium and moderate affinity for the polymer particles. In many instances, the stabilizer may be grafted on to the surface of the polymer particles, either during or after the polymerization process.

As the stabilizer concentration is increased, the particle size decreases, which implies that the number of nuclei formed increases with increasing stabilizer concentration. The coagulation nucleation theory very well accounts for the observed dependence of the particle size on stabilizer concentration, since the greater the concentration of the stabilizer adsorbed the slower will be the coagulation step. This results in more precursors becoming mature particles, thus reducing the size of dispersions produced.

As the solvency of the dispersion medium increases, (a) the oligomers will grow to a larger MW before they become a precursor nuclei, (b) the anchoring of the stabilizer moiety will probably be reduced and (c) the particle size increases. As the initiator concentration is increased, it has been observed that the final particle size increases. As for the kinetics, it is reported that when the dispersion medium is a non-solvent for the polymer being formed, then the locus of polymerization is largely within the growing particles and the system follows the bulk polymerization kinetics, n (the kinetic chain length)=$R_p/R_t$, where $R_p$ is the propagation rate and $R_t$ is the termination rate. As the solvency of the dispersion medium for the growing polymer particle is increased, polymer growth proceeds in solution. The polymeric radicals that are formed in solution are then captured by growing particles. Consequently, the locus of the particle polymerization process changes and there is a concomitant change in the kinetics of polymerization.

SUMMARY OF THE INVENTION

A process for synthesizing high molecular weight anionic dispersion polymer is disclosed, the process comprising providing a mixture of water, acrylic acid and a stabilizer; cooling the mixture to a temperature of less than 35° C.; lowering the pH of the mixture to less than 4.5; adding ethylhexyl acrylate to the mixture to form an aqueous solution; stirring the aqueous solution; purging the solution with nitrogen simultaneous with the step of stirring; heating the solution to about 48° C.; adding initiator for from about 2 to about 3 hours; heating the solution to about 75° C. for about 30 to about 60 minutes; and cooling and collecting the polymer.

DESCRIPTION OF THE PREFERRED EMBODIMENTS

The invention comprises a process for making anionic dispersion polymers of sodium acrylate/acrylic acid/ethylhexyl acrylate (EHA). EHA polymers having large particle size and good stability were obtained using the process of the invention and by using a solution terpolymer having the same composition as the final product as a stabilizer in preparing the composition. The dispersion polymers produced by the claimed process had intrinsic viscosities (IV's), of from about 4.0–10.0 dl/g and a bulk viscosity>18,000 centipoise (cps). These dispersion polymers further showed excellent activity as retention aids for papermaking processes.

The use of a low molecular weight EHA having IV's from about 0.6 to about 3.0 in the synthesis of the high molecular weight terpolymer was found to be critical for the shelf stability of the dispersion.

Preferably, a compound selected from among ammonium sulfate, ammonium chloride, glycerine, sodium chloride, sodium sulfate and ethylene glycol is used in the process of the invention to reduce bulk viscosity. Most preferably, the compound is ammonium sulfate. The optimum concentration of ammonium sulfate used is approximately 21–26% by weight based on water.

Partial neutralization of the acrylic acid (AA) starting material to a pH of less than 4.5 increases the solubility of acrylate esters such as EHA in the aqueous polymerization medium, and facilitates the formation of a smooth solution/dispersion polymer.

The use of crosslinkers such as polyethylene glycol (PEG)600 dimethacrylate, methylenebisacrylamide, and vinyl trimethoxysilane, at the levels tried, did not influence the product characteristics.

Since particle size in dispersion polymerization is inversely proportional to the concentration of the stabilizer, stabilizer concentration can be used to fine tune the particle size and, hence, the bulk viscosity of the dispersion.

Water soluble high molecular weight (MW) hydroxypropyl cellulose (Klucel H), hydroxypropyl methyl cellulose (Methocel J40 MS-N) and 8876 (AKA 8677, pAA with IV~1.2) could not be used as stabilizers because of their insolubility in the presence of 10% salt (ammonium sulfate or $CaCl_2$) and low pH, ~2.0. Therefore, to improve the water solubility of the stabilizers at low pH and in the presence of salts, solution polymers of NaAMPS/sodium acrylate (NaAc) with varying composition and MW were synthesized, as shown in Table I below.

Preferably, a stabilizer consisting of low levels of some hydrophobic monomer is used along with NaAMPS and/or NaAc. Preferably, hydrophobic monomers such as 2-ethylhexyl acrylate (EHA), N-benzyl methacrylamide, vinyl acetate, lauryl acrylate (LA), and caprolactone acrylate (CLA) were chosen as the comonomer. Phase separation of the solution polymers upon long standing or the formation of some insolubles was encountered in the presence of the hydrophobic monomers depending on their level and the polymerization pH. The formation of small amounts of insolubles could not be overcome whenever CLA or LA was used because of the difference in the reactivity ratios of the monomers.

The following examples are presented to describe preferred embodiments and utilities of the invention and are not meant to limit the invention unless otherwise stated in the claims appended hereto.

EXAMPLE 1

| Synthesis of a Stabilizer | |
|---|---|
| Ingredients | Wt % |
| Acrylic acid | 5.0690 |
| DI water | 88.8390 |
| Sodium hydroxide, 50% | 4.2270 |
| Ethylene diamine tetraacetic acid/sodium salt | 0.0090 |
| 2-Ethylhexyl acrylate | 1.8060 |
| 2,2-azobis isobutylnitrile | 0.0500 |
| Total | 100.0000 |

Procedure

1. Water, acrylic acid and ethylene diamine tetraacetic acid (EDTA)/sodium salt were weighed into a beaker equipped with a magnetic stirrer. The contents were cooled in an ice bath. With stirring, caustic was added dropwise maintaining the temperature <35° C. until the pH was around 4.5.

2. The aqueous solution was transferred to a polymerization flask, which was equipped with a stirrer, thermistor probe, and a condenser. Ethylhexyl acrylate was then added to the aqueous monomer solution.

3. With stirring, the solution was heated to 48° C. under nitrogen.

4. V-50 was added and the polymerization was continued for 2 hours at 48° C. Then the solution was postheated to 75° C. and held for 1 hour.

5. The product, a terpolymer of NaAc/AA/EHA, 66/22/12 M%, was cooled and collected. The clear liquid (8.0% actives) had an IV of 2.7 dl/g.

EXAMPLE 2

| Ingredients | Wt % |
|---|---|
| Acrylic acid | 6.6930 |
| DI water | 50.3494 |
| NaOH, 50% | 5.5849 |
| Stabilizer, 3691-197B, 6% soln. | 11.5820 |
| Ammonium sulfate (I) | 19.8954 |
| Glycerine | 0.5116 |
| Ethylene diamine tetraacetic acid/sodium salt | 0.0142 |
| 2-Ethylhexyl acrylate | 1.9469 |
| 2,2-azobis isobutylnitrile (I) | 0.0003 |
| 2,2-azobis isobutylnitrile (II) | 0.0017 |
| 2,2-azobis isobutylnitrile (III) | 0.0100 |
| Ammonium sulfate (II) | 3.4106 |
| | 100.0000 |

Procedure

1. Acrylic acid and DI water were weighed into a beaker and caustic was slowly added until the pH was ~4.5. Then the stabilizer, ammonium sulfate, glycerine and EDTA were added and the stirring was continued until a clear solution resulted.

2. It was then transferred into a polymerization flask which was fitted with a stirrer, thermistor probe, and a condenser.

3. Ethylhexyl acrylate was added to the above solution and agitated under nitrogen.

4. After 10 minutes the solution was heated to 48° C. and V-50 (I) was introduced as a 0.1% solution. The reaction was held at 48° C./3 hrs. Then V-50 (II) was added as a 1% aq. solution and the reaction was held at 48° C./1 hr. Then V-50 (III) was introduced as a 10% solution and held at the same temperature for another hour. Then the temperature was raised to 65° C. and held for 1 hour.

5. Ammonium sulfate (II) was then added and the dispersion was mixed for 15 minutes. It was then cooled and collected.

| Product Characteristics | |
|---|---|
| Composition | NaAc/AA/EHA, 68/22/10 M % |
| Color/State | White/Thick fluid |
| Polymer solids | 10.2% |
| BV (#3/6 rpm) | 18,000 cps |
| IV | 2.6 dl/g |

TABLE I

SYNTHESIS OF STABILIZERS, SOLUTION POLYMERS OF AA/NaAc/EHA

| LN NO. 3691- | MONOMERS COMPOSITION | M RATIO | MONOMER M % AA/% 2,2-azobis isobutylnitrile | | | | | |
|---|---|---|---|---|---|---|---|---|
| | | | CONC % | pH | NEUT'D | BOM | IV | REMARKS |
| 186C | NaAc/AA/EHA | 72/23/5 | 10.0 | 4.5 | 75 | 0.53 | 3.52 | Clear soln |
| 186D | NaAc/AA/EHA | 72/23/5 | 7.5 | 4.5 | 75 | 0.53 | 2.7 | Clear soln |
| 186E | NaAC/AA/EHA | 72/23/5 | 7.5 | 4.5 | 75 | 1.06 | 2.3 | Clear soln |
| 187A | NaAc/AA/EHA | 72/23/5 | 9.5 | 4.5 | 75 | 0.56 | 2.53 | Clear soln |
| 197A | NaAc/AA/EHA | 66/22/12 | 10.0 | 4.5 | 75 | 0.63 | 2.71 | Clear soln |
| 197B | NaAc/AA/EHA | 66/22/12 | 8.0 | 4.5 | 75 | 0.63 | 2.11 | Clear soln |
| 197C | NaAc/AA/EHA | 66/22/12 | 8.0 | 4.5 | 75 | 1.25 | 1.8 | Clear soln |
| 197D | NaAc/AA/EHA | 66/22/12 | 6.0 | 4.5 | 75 | 1.32 | 1.7 | Clear soln |

EHA = Ethylhexyl acrylate

EXAMPLE 3

Salts

Salt was used to lower the solvency of water to the polymer formed and thereby promote the growth of sterically stabilized discrete particles. Following the disclosure of the Dow patent, NaCl and $Na_2SO_4$, 10–20%, were unsuccessfully tried. After a series of failures to stabilize the dispersions using the above salts, as well as $MgCl_2$, subsequent work was restricted to ammonium sulfate, the level of which was varied in each experiment depending upon the monomer concentration.

EXAMPLE 4

Monomer concentration plays a major role in dispersion polymerization. Sometimes a high concentration of monomers in the reaction medium negates the steric stabilization effect by virtue of its solvency on the stabilizer. Consequently, there is less of a driving force for adsorption than when the reaction medium is relatively a poor solvent for the stabilizer. Most of the polymerizations were carried out at 12–16% monomer concentration. Whenever the monomer concentration was 18% or over, gelation ensued invariably.

EXAMPLE 5 pH also plays a key role in dispersion polymerization of anionics. At the inherent pH of acrylic acid solutions (1.8–2.2), clumping was frequently encountered due to the poor solubility of Polyacrylic acid in water due to strong intermolecular H-bonding. Conversely, upon complete neutralization, at pH~8.5, invariably highly viscous solution polymers were obtained. When the monomer composition was varied with hydrophobic monomers such as EHA, LA or CLA, a pH ~4.5 was found to be desirable since the acrylic esters were still water soluble, Table I.

EXAMPLE 6

Polymerizations of AA at 10–20% in water were attempted in the presence of 15–20% NaCl or $Na_2SO_4$. Upon using PVP (K-15, K-30 and K-60, MW 10M, 40M and 160M respectively) at 1–2% based on product, a soft or hard gel was formed invariably. In order to modify the solubility characteristics of pAA in water, hydrophobic monomers such a styrene, methyl acrylate and vinyl acetate were tried as comonomers, 3–15%. Again, soft/hard gelation was encountered invariably. Repeated attempts to reproduce anionic dispersions per the above Dow patent were unsuccessful. Similarly, duplicate attempts to reproduce pAA dispersion as per Kyoritsu Yuki's patent also led to gelation during polymerization and no stable dispersion was ever obtained.

After a series of failures, a smooth dispersion of pAA was obtained in the presence of 8% of a steric stabilizer composed of NaAMPS/NaAc copolymer. On standing overnight, the dispersion congealed, but redispersed on hard shaking.

Use of an 80/20 DADMAC/DMAEM.BCQ solution copolymer, at 8% BOM as a stabilizer in the dispersion polymerization of AA resulted in lumps, probably due to ionic crosslinking. Similar results were encountered upon polymerization of NaAc/DMAEA.BCQ (with the quat at 3–10 M%). To lower the polymer solubility in the dispersion medium, different hydrophobic monomers were copolymerized with AA. At first, EHA was attempted at 3 M% and good dispersions were obtained, which upon standing congealed. Similar results were obtained with methyl acrylate and butyl acrylate, but no more work was pursued with these hydrophobic monomers because they are irritants and lachrymators.

To reduce the solubility of the stabilizer in acidic aqueous medium, copolymers of NaAMPS/NaAc containing 10–20 M% NaAMPS were prepared. They were found to be insoluble in the acidic monomer solution containing the salt. Since NaAMPS/NaAc, 30/70, copolymer displayed complete solubility in the above monomer solution when used as a stabilizer, polymerization of AA with poorly hydrophilic comonomers such as N-benzyl methacrylamide (NBMA), N-tertbutyl acrylamide (TBAA) and 3-acrylamido-3-methyl butanoic acid (AMBA) were unsuccessfully tried. Similar results were obtained when the terpolymers of AA/AMPS/NBMA, 25/70/5, IV's 1.6–5.0, were used as the stabilizer.

Increasing the EHA level to 14 M% reduced the activity of the dispersion, 3691–155A, Table III. Incorporation of vinyltrimethoxysilane, 0.1–1.0% BOM, into the above copolymer resulted in high levels of insolubles due to excessive cross-linking through the siloxanes.

TABLE II

| Ln No 3691- | Monomers Name/Name/Name | M Ratio | Conc % | Wt % AmSO$_4$ BOW | STABILIZER ID. No. | STABILIZER WT % | X LINKER Name | X LINKER % BOM | pH | PART DIAM | IV | BV CPS |
|---|---|---|---|---|---|---|---|---|---|---|---|---|
| 155A | NaAc/EHA | 86/14 | 15.0 | 21.3,30.2 | 64A | 10.0 | — | — | 7.1 | — | 2.0 | 22000 |
| 158A | NaAc/EHA | 90/10 | 16.0 | 35.7 | 144B | 10.0 | VTMS | 1.0 | 7.1 | — | 2.2 | 11600 |
| 158B | NaAc/EHA | 90/10 | 16.0 | 35.7 | 144B | 10.0 | VTMS | —.5 | 7.1 | — | 2.3 | 6400 |
| 160A | NaAc/EHA | 90/10 | 16.6 | 30.0 | 144B | 10.0 | VTMS | 0.1 | 7.1 | — | 1.7 | — |
| 160B | NaAc/EHA | 90/10 | 16.3 | 33.0 | 144B | 10.0 | VTMS | 0.25 | 7.1 | — | 2.0 | — |
| 172B | DEAA/NaAc | 10/90 | 12.5 | 18.2 | 162A | 6.0 | — | — | 8.5 | — | 2.1 | 3600 |
| 174B | AcAm/DEAA/NaAc | 60/10/30 | 12.5 | 20.3,22.3 | 162A | 10.0 | — | — | 8.5 | — | 9.1 | — |
| 175A | DEAA/NaAc | 10/90 | 12.5 | 21.2 | 173B | 10.0 | — | — | 8.5 | — | 2.1 | — |
| 175B | AcAm/NaAMBA | 70/30 | 12.5 | 20.2,22.2 | 173B | 10.0 | — | — | 8.5 | — | — | — |
| 180A | NaAc/LA | 95/5 | 12.5 | 22.0,26.0 | 179B | 10.0 | — | — | 7.1 | — | — | — |
| 180B | NaAc/LA | 97/3 | 12.5 | 22.0,26.0 | 179B | 10.0 | — | — | 7.1 | — | — | — |
| 180C | NaAc/LA | 97/3 | 12.5 | 20.3,23.6 | 179B | 5.0 | — | — | 7.1 | — | 1.7 | — |
| 189 | NaAc/CLA | 94/6 | 12.5 | 21.5 | 188A | 8.0 | — | — | 7.1 | — | — | — |

IPPA = N-isopropyl acrylamide
VTMS—Vinyltrimethoxysilane
3691-144B = NaAMPS/EHA, 90/10, 10%, IV = 1.8
3691-161B = NaAc/DEAA, 80/20, 15%, IV = 6.4
3961-162A = NaAc/DEAA, 70/30, 10%, IV = 4.5
DEAA = N,N-Diethyl acrylamide
NaAMBA = 3-Acrylamide-3-methyl butanoic acid, Na salt
3691-173B NaAc/DEAA, 90/10, 12.5%, IV = 1.3
3691-179B = NaAc/LA, 95/5, 15.0% IV = 2.2
3691-188A = NaAc/CLA, 94/6, 10.0%, IV = 3.8
Glycerine was used as a costabilizer at 6.0% BOM
Polymerization was carried out at 48° C./5 hours with V 50 at 40 ppm based on product

EXAMPLE 7

It is widely accepted that as long as the water insoluble monomer is in the liquid state at the polymerization temperature, it has a good chance of copolymerizing with AA or NaAc. Therefore, the commercially available and odorless caprolactone acrylate and lauryl acrylate were copolymerized in solution with NaAc. Phase separation and/or formation of some insolubles were encountered with these systems, however low the level of the ester was, as a consequence of the difference in the reactivity ratios.

Changes can be made in the composition, operation and arrangement of the method of the present invention described herein without departing from the concept and scope of the invention as defined in the following claims:

I claim:

1. A process for synthesizing high molecular weight anionic dispersion polymers, the process consisting of:

providing a mixture of water and acrylic acid;

cooling the mixture to a temperature of less than 35° C.;

lowering the pH of the mixture to less than 4.5;

adding from about 2.0 about 20.0% by weight of ammonium sulfate, glycerine, ethylene glycol and a low molecular weight terpolymer of 66 mole percent acrylic acid, 22 mole percent sodium acrylate and 12 mole percent ethylhexyl acrylate, wherein the intrinsic viscosity of the terpolymer is from about 0.6 to about 3.0 to form an aqueous solution;

stirring the aqueous solution; adding from about 3 mole percent to about 14 mole percent of ethylhexyl acrylate to the solution;

purging the solution with nitrogen simultaneous with the step of stirring; heating the solution to about 48° C.;

adding initiator for from about 2 to about 3 hours; heating the solution to about 75° C. for about 30 to about 60 minutes; and cooling and collecting the high molecular weight sodium acrylate/acrylic acid/ethylhexyl acrylate terpolymer, wherein the high molecular weight terpolymer has an intrinsic viscosity of from about 4.0 to about 10.0.

\* \* \* \* \*